March 2, 1954 E. V. COGINGS 2,670,860
ROTARY VEHICLE PARKING ELEVATOR
Filed Dec. 30, 1949 8 Sheets-Sheet 1

INVENTOR.
EDWARD V. COGINGS,
BY
ATTORNEY

March 2, 1954

E. V. COGINGS 2,670,860

ROTARY VEHICLE PARKING ELEVATOR

Filed Dec. 30, 1949

INVENTOR.
EDWARD V. COGINGS,
BY

ATTORNEY.

March 2, 1954

E. V. COGINGS 2,670,860

ROTARY VEHICLE PARKING ELEVATOR

Filed Dec. 30, 1949

INVENTOR.
EDWARD V. COGINGS,
BY
ATTORNEY.

March 2, 1954

E. V. COGINGS 2,670,860

ROTARY VEHICLE PARKING ELEVATOR

Filed Dec. 30, 1949

INVENTOR.
BY EDWARD V. COGINGS

ATTORNEY.

Patented Mar. 2, 1954

2,670,860

UNITED STATES PATENT OFFICE 2,670,860

ROTARY VEHICLE PARKING ELEVATOR

Edward V. Cogings, Miami, Fla.

Application December 30, 1949, Serial No. 135,970

4 Claims. (Cl. 214—16.1)

This invention relates to improvements in vehicle parking systems and has for its object, means for conveying a vehicle to and from a selected storage level by novel loading, conveying and discharge mechanism.

It is an object of the present invention to provide a wheel-like structure supporting a plurality of equidistantly spaced vehicle supporting platforms maintained against tipping or overbalancing under the weight of supported vehicles, conveying the vehicle in an arcuate path to a selected level and automatically discharging the vehicle from the platform at the selected level independent of manual effort.

The invention further contemplates the reloading of the vehicle upon the platform upon the opposite side of the conveyor in a novel manner whereby the vehicle will shift by mechanical and electrical means from the selected level to full platform engagement and, upon its fully loaded position, to interrupt the mechanical and electrical means.

Another and very important object of the invention resides in a novel platform construction suspended from a single shaft carried by a rotatable elevating conveyor, with means associated with the conveyor and platform shafts to accurately maintain the platforms level under all degrees of overbalancing weight, with the platforms equipped with wheel tracks and automatic loading and unloading conveyor rollers actuable when the platform stops at a selected level, with means extending into the wheel tracks to be engaged by the vehicle front wheels for interrupting the movement of the rollers when a vehicle is fully loaded thereon and means located at the selected level for re-establishing the actuation of the rollers for shifting the vehicle onto the selected level and away from the platform.

Another object of the invention resides in novel drive and control means for the rotary platform supporting conveyor, controlled in a manner whereby the movement of the conveyor will stop automatically and momentarily with the several platforms accurately aligned with the several floor levels, with the movement of the conveyor resumed automatically until a loaded platform has stopped at a selected floor level, at which time the conveyor mechanism will remain inactive during the interval necessary for the platform rollers to shift the vehicle to the floor level.

A further object of the invention resides in automatically actuated gates at each floor level that are shifted to open position when a loaded platform reaches the selected level, with all of the gates being selectively actuated from a central control panel, with any one of the gates being opened or a combination of gates being opened, serving to actuate switch mechanism that maintains the conveyor drive means inoperative so long as any gate remains open.

The invention further contemplates novel interrupter means for the conveyor drive that accurately stops the conveyor and its supported platform at floor level and a novel brake device that is progressively applied to the conveyor shaft as the platforms approach the floor levels, whereby the maximum braking force will be applied as the platforms reach the floor levels, thus preventing creeping of the conveyor when the drive is finally interrupted and means whereby, when the platforms reach the accurate alignment with the floor, the brakes will be automatically released and positioned for the next braking application, the brakes being alternately applied and released as the several platforms reach the floor levels.

A further object of the invention resides in a modified form of manually controlled platform supporting conveyor that is controlled from floor to floor by an operator travelling with the vehicle.

Other novel features of construction and electrical circuits for controlling the several functions of the device will be readily apparent during the course of the following description, reference being had to the accompanying drawings wherein has been illustrated preferred examples of the invention and wherein like characters of reference denote like parts throughout the several figures.

Referring to the drawings.

Figure 1:
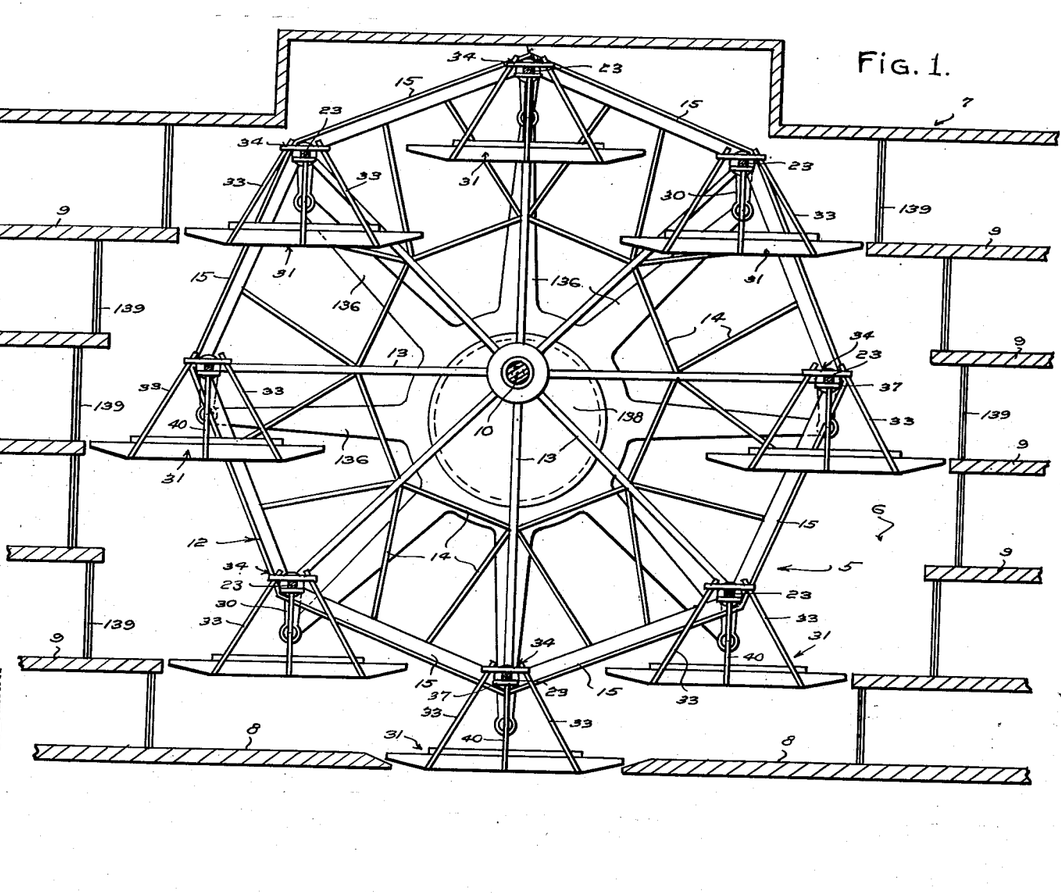
Figure 1 is a central vertical section of a rotary conveyor constructed in accordance with the invention, the enclosing housing being shown in section.

Referring specifically to the drawings, the numeral 5 designates a rotary conveyor as a whole, supported in a well 6 that forms a part of a vehicle storage building 7, having a ground floor level 8 and a plurality of superposed floor levels 9. The building may be of any suitable construction and design that is calculated to conveniently house for storage a maximum number of motor vehicles in a minimum of space.

Figures 8, 9, 10:
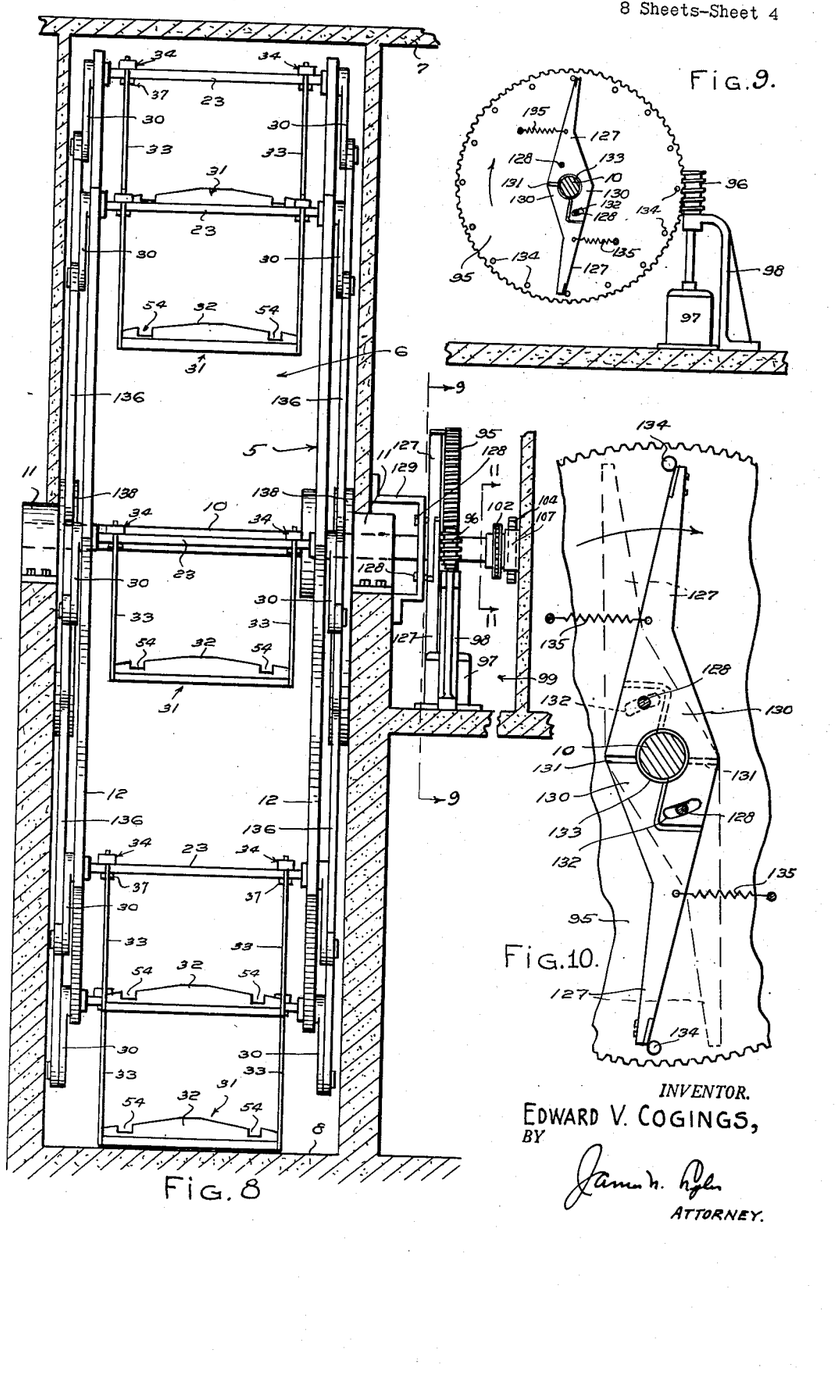
Figure 8 is a vertical transverse section through the housing, with the conveyor and associated parts in elevation.
Figure 9 is a transverse section taken on line 9—9 of Figure 8, illustrating the conveyor drive and braking means.
Figure 10 is an enlarged face view of the braking means shown in Figure 9.

The rotary conveyor is supported upon a main drive shaft 10, journalled in suitable antifriction bearings 11, mounted in the side walls of the well 6. The conveyor 5 may be of any desirable shape, such as square, circular, hexagonal or octagonal and comprises a pair of spaced identical frames 12, formed of angle irons, T-irons or channel irons, welded or otherwise joined at their ends to form a balanced structure concentric with the shaft 10. The frames 12 are supported with respect to the shaft 10, by radial spokes 13, with the spokes braced, as shown at 14. Other bracings, not shown, pass between the frames 12, forming a cage-like structure that is rigid against twisting or flexing. The frames 12, as disclosed in this application, are made up of a plurality of straight sections 15, of even number, whereby the conveyor will be accurately balanced at all times.

Figures 17, 18:
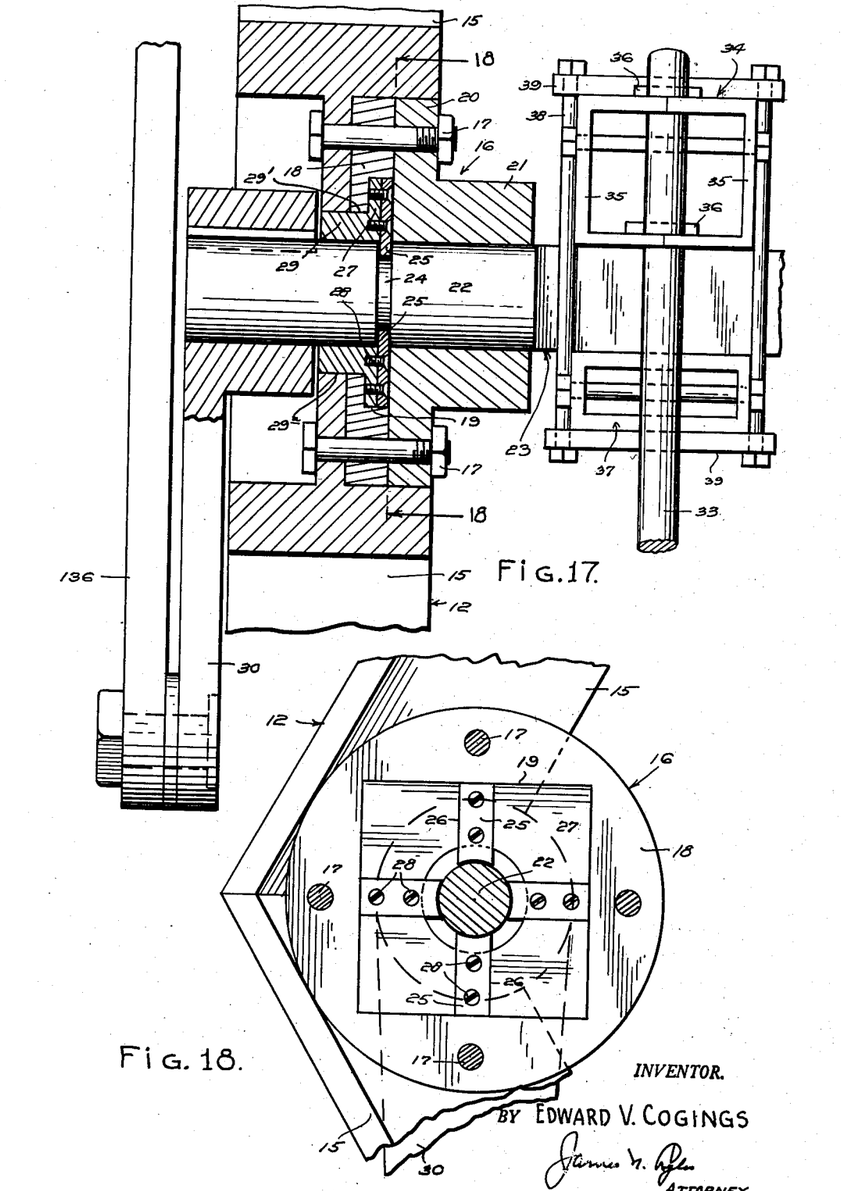
Figure 17 is an enlarged section taken through one of the shaft bearing for the platform supports.
Figure 18 is a section on line 18—18 of Figure 17.

Equidistantly spaced about the periphery of the frames 12 at the several points of connections for the straight sections 15, are bearings 16, bolted to the frames, as at 17. Each bearing 16 comprises a circular plate 18, provided with a square recess 19 and a plate 20, corresponding in size and shape to the plate 18. The plate 20 carries a tubular hub bearing 21, for rotatably supporting the cylindrical section 22 of a cross shaft 23. The bearings of each frame 12 are identical and in axial alignment and the opposite ends of the shaft 23 are identical. That portion of the shaft 23 extending between the bearings 16, is preferably formed square in cross section, for a purpose to be described. Each cylindrical portion of the shafts 23 is circumferentially grooved, as at 24, for the reception of radial keys 25, removably held in slots 26, cut in a square plate 27 and held by screws 28. The plate 27 seats wholly within the recess 19 with its outer face flush with the outer face of the plate 18. The plate 27 is held against displacement by the abutting relation of the plate 20, with the plates 18 and 20 bolted to the frame 12 by the bolts 17. The plate 27 carries a concentric cylindrical hub bearing 29, extending through an opening 29' of the plate 18 and a corresponding opening 29a of the frame 12, with the hubs 21 and 29 serving as the bearing surfaces for the shaft sections 22. The bearing hubs 21 and 29, while being shown plain, will obviously be supplied with any conventional antifriction means. The cylindrical shaft section 22 is extended beyond the outer side of the frames 12 and have keyed or otherwise fixed thereon, vertically arranged crank arms 30, for connection at their free ends to a leveling device, to be described. The purpose of the keys 25 is to prevent endwise shifting of the shafts 23 with respect to the frames 12. Should it become necessary for any reason to remove the shaft 23, the plates 20 are first unbolted and shifted outwardly upon the shafts, after which the keys may be easily removed.

Figures 2, 3:
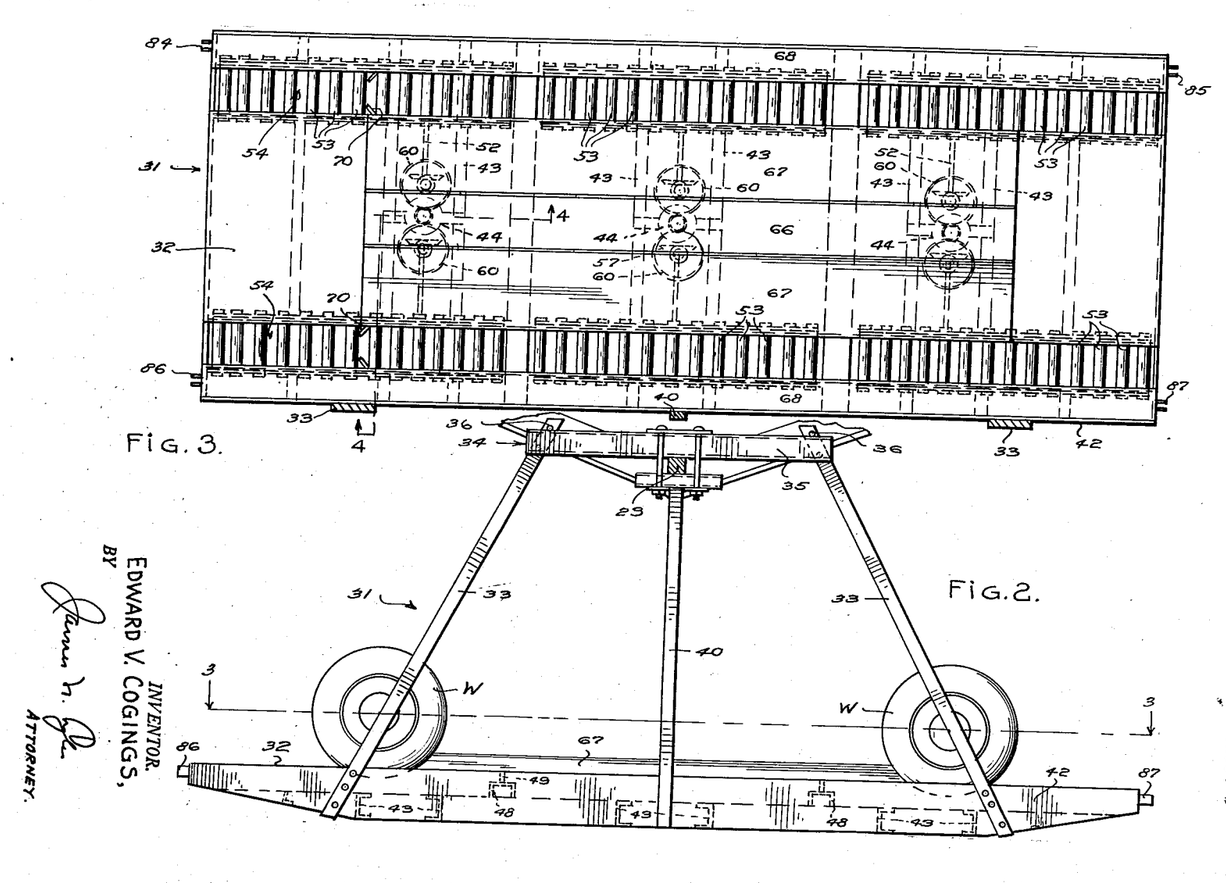
Figure 2 is an enlarged side elevation of a vehicle supporting platform, with its supporting shaft in cross section.
Figure 3 is a top plan view of the platform with the supporting means shown in section, taken approximately on line 3—3 of Figure 2.
Figures 4, 5, 6, 7:
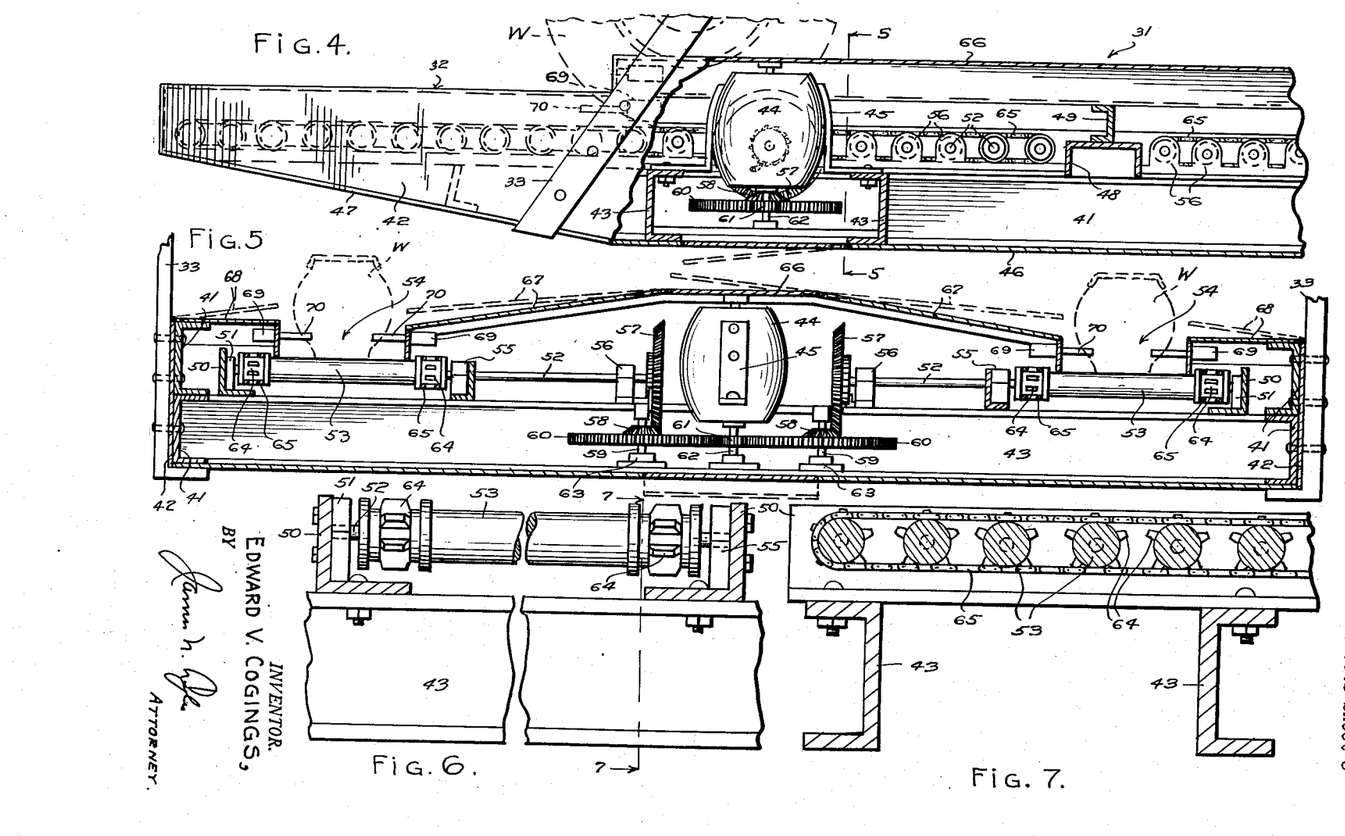
Figure 4 is an enlarged fragmentary longitudinal section of the platform, taken on line 4—4 of Figure 3.
Figure 5 is a transverse section taken on line 5—5 of Figure 4.
Figure 6 is an enlarged side elevation of one shifting roller of the platform, with its supporting structure in section.
Figure 7 is a section on line 7—7 of Figure 6.

Each shaft 23 serves as the supporting means for vehicle carriers, designated as a whole by the numeral 31 and comprises a platform 32, supported from the shafts 23 by diagonal hanger bars 33, connected upon opposite sides of the shafts 23 and adjacent each frame 12 by cross-heads 34. The cross-heads 34 are formed of a pair of channel irons 35 bolted together with their flanges abutting. The bars 33 pass through openings formed jointly in the flanges and are held against displacement by pins 36. A second, but shorter cross-head 37 underlies the squared portion of each shaft 23 and the heads 34 and 37 are firmly held in clamping engagement with the opposite flat sides of the shaft 23 by bolts and plates 38 and 39. The cross-head 37 supports vertical hanger bars 40, connected at their lower ends with the sides of the platforms, intermediate the length of the platform. As clearly shown, the hangers are arranged upon each shaft adjacent the hubs 21, while the carriers are suspended therefrom. The carriers are of a width to support a motor vehicle and have sufficient clearance at their sides with the frames 12 to permit the conveyor to rotate in a vertical plane with the carriers suspended and maintained with their platforms level at all times, regardless of varying overbalancing weight.

Referring now particularly to Figures 2, 3, 4, 5, 6 and 7, each platform is formed of a plurality of connected beams, both transversely and longitudinally. Longitudinal channel irons 41 form the rigid side frame for the carriers and bolted or otherwise fixed to the channel irons 41, are side plates 42. Transverse channel irons 43 are welded to the channels 41 and the channels 43 are arranged in opposed pairs in spaced relation to form supports for driving motors 44, supported thereon by brackets 45. One pair of channels 43 are located intermediate the ends of the carrier while the other two pair are located in spaced relation thereto adjacent the opposite ends of the carrier. The channels 41 and 43 jointly carry a bottom cover plate 46. The bottom of the platform is preferably bevelled at its opposite ends, as at 47, to facilitate floor clearance and the channels 41 are likewise bevelled to at their ends to conform to the bevel of the platform. Intermediate transverse channels 48 extend across the structure and are welded to the channels 41, while smaller parallel channels 49 are supported upon the top of the channels 48, with the channels 48 and 49 dividing the structure into separate roller compartments. Arranged longitudinally of the structure and parallel and adjacent to the channels 41, are angle irons 50, which extend throughout the length of the platform. The angle irons 50 carry a plurality of bearings 51, bolted thereto, for the rotatable support of shafts 52, carrying rollers 53. The rollers are transversely arranged in groups upon opposite sides of the platform and are relatively closely arranged to form the base for vehicle wheel trackways 54, extending for the full length of the platform. Since as shown, there are three groups of rollers, it has been found advantageous to provide independent driving motors 44 for each group. While but a single driving motor and its associated drive gears have been shown, the three are identical and a description of one will suffice for all. The inner ends of the shafts 52 are rotatably supported in bearings 55, while the shaft 52 of one roller upon opposite sides of the platform in each group is extended inwardly and is further journalled at its inner end in bearings 56. The inner extended end of the shafts carry relatively large bevelled gears 57, facing in the same direction. The gears 57 mesh with small bevelled gears 58 at right angle thereto, carried by vertically arranged shafts 59. Also fixed upon the shafts 59, are relatively large spur gears 60, jointly meshing with a small pinion gear 61, carried upon the motor shaft 62. The shafts 59 are suitably journalled in bearings 63. Each roller 53 is provided adjacent its ends with sprocket teeth 64, with flanges arranged upon both sides of the sprockets. A common sprocket chain 65 engages the rollers of each group upon opposite sides of the platform for driving the rollers in unison and in the same direction.

A housing 66 is arranged over the drive motors, while inclined hinged cover plates 67 extend outwardly to overlie the inner ends of the rollers and their sprockets and chains. The housing 66 may also be hinged to provide ready access to the motors, while the cover plates provide access to the inner bearings 56. Outer cover plates 68, extending for the full length of the platform are hinged at their outer edges to the side plates 42 and provide access to the bearings 51. The several motors 44 are connected to a source of electrical energy in a manner to be presently described. Arranged within the housing adjacent the sides of each trackway 54 and near one end of the platform, are electrical switches 69, having switch arms 70, normally extending into the trackways 54 in the path of movement of vehicle wheels W. The contacting movement of the wheels W, move the arms 70 for operating the switches to interrupt the flow of energy to the motors when the vehicle has fully engaged the platform to be transported to an elevated level. The switches 69 are clearly illustrated in Figure 16 and its operative electrical connections are clearly illustrated in Figure 19, to be later described. The switches 69 include contact fingers 71, for make and break connection with a fixed contact 72 and are normally moved to contacting position by a spring 73. The switches 69 may be arranged in pairs for each trackway 54 in order that a wheel W will contact the arms 70, regardless of of the diameter of the tires of the wheel or when the wheels are to one side of the tracks.

Figures 13, 14, 15, 16:
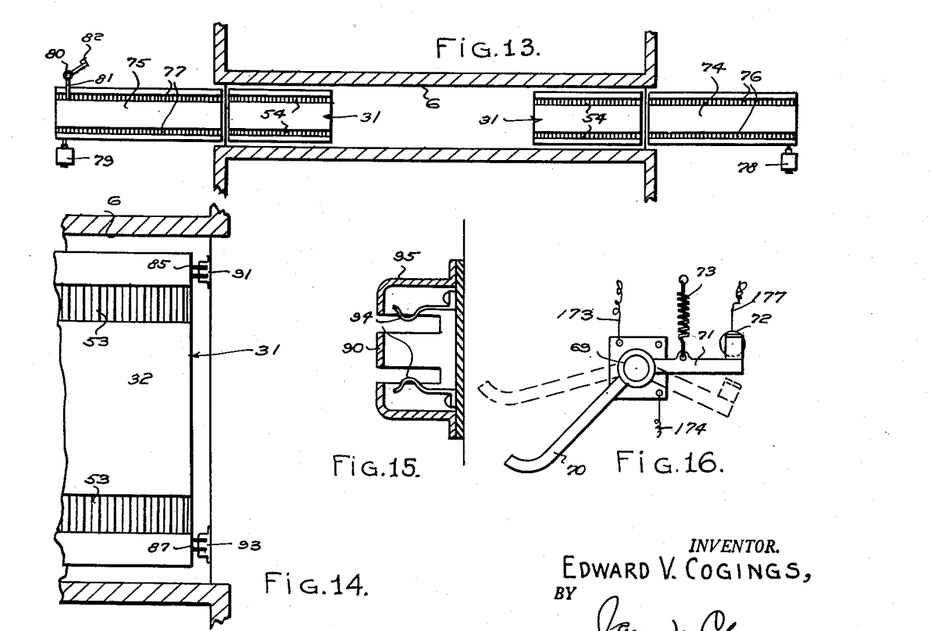
Figure 13 is a view illustrating the loading and unloading means for the floors and platforms.
Figure 14 is an enlarged fragmentary plan view of one end of a platform and an adjacent floor level, illustrating circuit connectors.
Figure 15 is an enlarged circuit connector, shown in section.
Figure 16 is a plan view of a vehicle wheel actuated switch carried by the platforms and the floors on the unloading side of the conveyor.

In Figure 13, has been illustrated more or less diagrammatically the relationship of the carriers 31 with respect to the floor level unloading and loading roller conveyors. The loading roller conveyor 74 will be substantially identical upon each floor level 9, while the ground floor 8 may be provided with a series of such loading conveyors. The unloading conveyors 75 are similar to the conveyors 74 and each of the conveyors 74 and 75 employ roller trackways 76 and 77, with the rollers being driven by motors 78 and 79. The unloading conveyors 75 upon the ground floor 8 may also be arranged in multiple. Each conveyor 75, adjacent its discharge end is equipped with a cut-out switch 80, similar to the switches 69 and having an arm 81, projecting into the trackway for contact with the wheel W of the vehicle, whereby the motion of the vehicle is halted automatically when fully disengaged from the carrier 31. The switches 80 also carry contact arms 82, for make and break contact with a fixed contact point 83, to be later described with respect to Figure 19. Each carrier platform 32 is provided at its opposite ends with contact points 84 and 85 and 86 and 87. The contact points 84 and 85 establish a flow of electrical energy to the motors 44 for the unloading and loading respectively of the vehicle in a manner to be described, while the contacts 86 and 87 are bridging contacts for establishing a flow of current to gates, to be described. The contacts 86 and 87 are connected by a wire 88 and 89. The contacts 84, 85, 86 and 87 frictionally engage spring contacts 90, 91, 92 and 93 caried at each floor level and engaged by the contacts 84, 85, 86 and 87 successively as the conveyor carries the platforms from floor to floor. In Figure 15 has been illustrated one of the contacts 90 in section and, while all of the contacts 90, 91, 92 and 93 are identical, a description of one will suffice for all. Each contact 90 has a pair of spring contact fingers 94 that are contained in a housing 95, slotted upon its front wall for the passage of the contacts 84 to 87 inclusive. The housing has been provided as a safety measure to avoid accidental contact by the hand of the operator. The housings are rigidly fixed in the path of movement of the carrier contacts at each floor level. The relationship of the several contacts have been illustrated in Figure 14.

Figure 11:
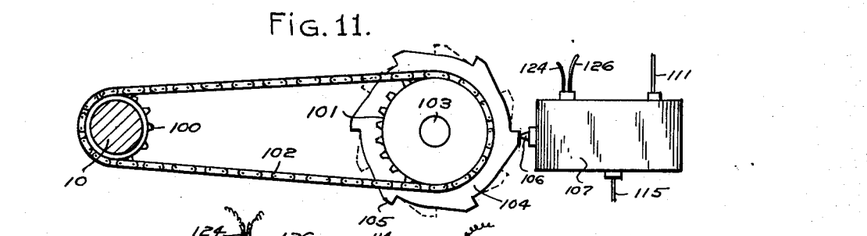
Figure 11 is an enlarged transverse section taken on line 11—11 of Figure 8, illustrating the conveyor drive cut-out.

Means are provided to control the rotary movement of the conveyor 5 continuously in one direction for alternate stopping of each platform at the several floor levels with the platform trackways 54 accurately aligned with the trackways of the floor conveyors 74 and 75. The drive means consists of a relatively large worm wheel 95, fixed adjacent the outer extended end of the shaft 10. The worm wheel 95 is driven through the medium of a meshing worm 96, driven by a motor 97, supported by a bracket 98, positioned in a control room 99 of the building 7. The conveyor is driven at a predetermined speed. Fixed upon the terminal end of the shaft 10, in the control room 99, is a small sprocket wheel 100, see Figure 11. The sprocket wheel 100 drives a larger sprocket wheel 101, through the medium of a sprocket chain 102. The sprocket wheel 101 is rotatable upon a shaft 103, suitably supported in bearings supported upon the wall of the control room 99. Rotatable with the sprocket wheel 101, is a toothed interrupter wheel 104, having radial cam teeth 105. The number of the cam teeth 105 is determined by the number of floor levels at which the platforms stop. The teeth 105 contact alternately with the outer end of a bar 106, see particularly Figure 12, for shifting the bar axially through a housing 107, supported rigidly in a position adjacent the wheel 104. The bar has fixed upon its opposite end and slidable within the housing, a contact block 108, with the bar and block urged in one direction by a compressible coil spring 109. The block 108 may be formed of insulating material and carries a contact point 110, connected with a flexible wire 111. The bar 106 slidably passes through a similar block 112, with the block 112 slidable independently of the bar and urged toward the block 108, by compressible coil springs 113. The block 112 may likewise be formed of insulating material and carries a contact point 114 for alternate contact with the point 110. The contact point 114 is connected with a flexible electrical conductor 115. The spring 109, being stronger than the springs 113, will shift the blocks 108 and 112 and rod 106 to the left, upon being freed from contact with the teeth 105.

Figure 12:
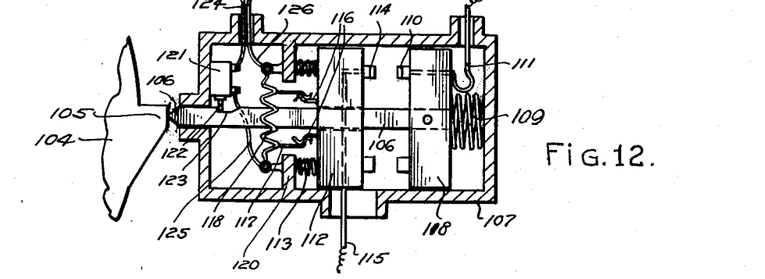
Figure 12 is an enlarged section through the cut-out housing and associated parts.

Means are provided to retain the block 112 in compressed engagement with the springs 113 momentarily when the bar 106 and its block 108 are shifted to the right by the teeth 105, comprising a pair of spring latch fingers 116, carried by the block 112, engaging a pair of cooperating spring latch fingers 117, carried by a coiled heater element 118, supported from lugs 119 projecting from a partition wall 120 of the housing 107. An electrical switch device 121, fixed to the housing wall, is provided with a switch actuating rod 122 alternately engaging in a depression 123 of the rod 106 when the rod is shifted by the teeth 105. An electrical conductor 124 leads through an opening in the housing 107 and is connected with one side of the switch 121, while a conductor 125 leads from the opposite pole of the switch to one end of the heater element 118. A conductor wire 126 leads from the opposite end of the element 118. In the use of this make and break mechanism, as the conveyor rotates and the carriers approach a floor level, a tooth 105 starts to shift the bar 106 axially for moving the block 108 away from the block 112. When the tooth 105 has fully engaged the bar 106, the block 108 has interrupted the flow of current through the conductors 111 and 115 and, since the conductor 115 leads to the drive motor 97, the motor will stop, with the several platforms properly positioned at their respective floor levels. Since the bar 106 has been moved inwardly, the actuating rod 122 of the switch 121 has dropped into the depression 123, establishing a flow of current to the heater element 118. When the element 118 has heated to the proper degree, it will expand, moving its latch fingers 117 outwardly for releasing the latch fingers 116. When this occurs, the springs will immediately shift the block 112 along the bar 106 to again contact the block 108 and reestablishing a flow of current to the motor 97 for again starting the rotation of the conveyor 5. Upon movement of the conveyor 5, the wheel 104 will then rotate, moving the teeth 105 away from the bar 106, at which time the spring 109 will shift the bar 106, block 108 and block 112 to the left, to the point where the block 112 will compress the springs 113 and reengage the spring latch fingers 116 and 117. The movement of the bar 106 to the left causes the switch 121 to interrupt the flow of current to the heater element, at which time its fingers 117 will grip the fingers 116. The actuation of this make and break connector for the conveyor drive motor is operative for each floor level and will momentarily stop the rotation of the conveyor for each floor, unless a vehicle is to be unloaded or loaded from or to a platform, in which case, other interrupter means, to be described, will maintain the motor 97 inactive during such unloading or loading.

Should it become necessary to provide braking means for the rotation of the shaft 10 to insure that the several platforms will be accurately aligned with their respective floor levels and to prevent coasting or creeping of the conveyor, a pair of oppositely disposed and identical brake levers 127, see particularly Figures 8, 9 and 10, are pivotally supported on pins 128, carried by a bracket 129, fixedly mounted in the control room 99 and positioned over the shaft 10. Each brake lever 127 has a head portion 130 and each head is notched out on its abutting side to permit overlapping and pivotal engagement of the levers with respect to each, as shown at 131. The overlapping portion of each head is provided with an arcuate slot 132, whereby the levers may swing in an arc around the pivotal pins of its companion lever. Each head is provided with a semi-circular opening 133 having a diameter that is slightly larger than the diameter of the shaft 10, with the openings 133 of the two levers jointly engaging over the shaft 10 for intermittent gripping engagement therewith. The levers 127, due to the position of their pivotal pins 128, swing in an arc that is eccentric to the axis of the shaft 10 and when pressure is exerted upon the outer ends of the levers, they swing upon their pivot pins 128 for progressively increasing their gripping action upon the shaft 10. The levers are mounted adjacent the worm wheel 95 and are swung progressively to braking and release position throughout the movement of the wheel 95, by a series of forwardly extending pins 134, a number of the pins corresponding to the number of floor levels. Since the movement of the levers is in an arc eccentric to the shaft 10, the levers when in fully released position, as shown by dotted lines in Figure 10, will be fully engaged by the pins 134 and as the wheel 95 moves in a clock-wise direction, the levers are swung on their pivots 128, progressively increasing the braking force on the shaft until the wheel 95 has rotated a distance equal to the distance between floor levels, at which time, the terminal ends of the levers 127 will have moved out of the path of travel of the pins 134. When this happens, the platforms will have stopped in perfect floor alignment and the levers will be swung to brake disengaging position by spring 135. Just prior to the maximum braking engagement of the levers and their release, the circuit to the motor 97 will be interrupted. The circuit breaker illustrated in Figure 12 and the arcuate swing of the levers 127 will obviously be adjustable to accurately position the several platforms in aligned position with the floor levels for loading and unloading.

Since each carrier is suspended from a cross shaft of the conveyor, it becomes necessary that means be provided to maintain the several carriers absolutely level at all times, regardless of the weight of a vehicle supported thereon, or whether the vehicle shall in itself be an overbalancing reason. To provide for this contingency the terminal ends of each shaft 23 has been provided with the vertically arranged crank arms 30. Pivotally connected with each crank arm 30, are radial arms 136, preferably formed integral with a ring 137, rotatably supported in a grooved bearing 138. The bearings 138 may be formed as an integral part of the bearings 11, or may be bolted thereto in fixed relation. As clearly shown, the bearings 138 are eccentric to the axis of the shaft 10 and the diameter of the bearings 138 is such that the pivotal connection with the cranks 30 is directly radial from the center of the bearings. The rings 137 and their radial arms 136 are rotated under the influence of the rotation of the conveyor 5 and will maintain the platforms in a level position at all times, regardless of any overbalancing weight thereon, or whether one group of platforms are loaded while the others are empty. Any overbalancing weight is evenly distributed throughout the conveyor by the cranks 30 and arms 136. This principle of maintaining an exact horizontal position of the platforms is well recognized.

Each floor level has an opening to the conveyor well 6, and each opening is protected by movable gates, indicated diagrammatically by the numerals 139. The gates are moved to open position by an electric motor 140, driving through a shaft 141 to the gate. A slip coupling 142 may be arranged in the motor drive to the gates, whereby the gates may be retained in open position during the interval a vehicle is either being loaded or unloaded, without damaging the motor. The particular gate control means has not been detailed, since such mechanism falls within a different classification and the illustration herein will be sufficient to properly illustrate a complete control system for the operation of the conveyor and the loading and unloading thereof. The diagrammatic illustration of the gates has been illustrated in Figure 19, wherein is shown a complete electrical distribution system for the operation of the conveyor from a remote point, such as a dispatch office located on the ground floor 8 of the building.

Figure 19:
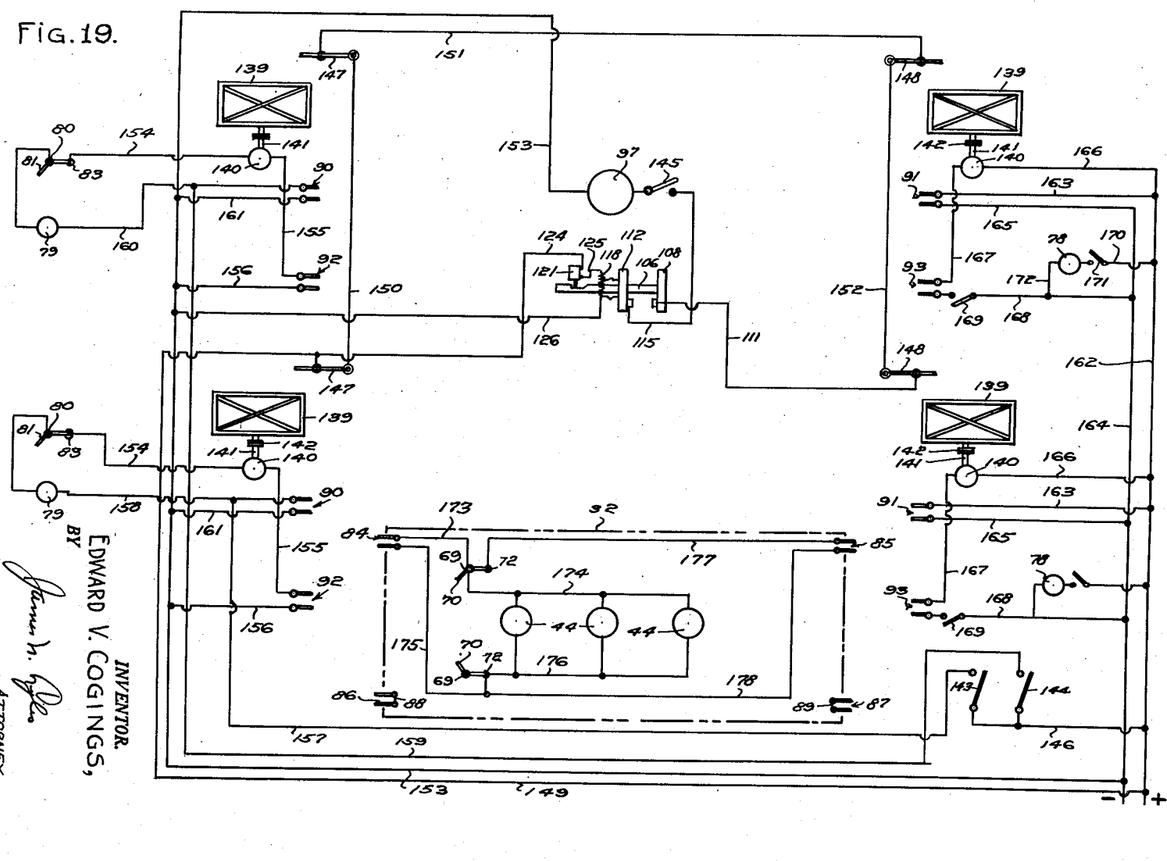
Figure 19 is a diagrammatic electrical circuit for the several mechanisms and, Figure 20 is a view similar to Figure 1, but illustrating a manually controlled conveyor.

Referring now to Figure 19, wherein has been illustrated the electrical circuits for two floors only, since all the floors will be controlled in a similar manner, a pair of selector switches 143 and 144 are located in a desirable position for the control of the system. A switch 145, that may be located either in the control room 99, or in a position adjacent the switches 143 and 144 serves to establish a flow of current to the drive motor 97 for imparting rotation to the conveyor 5. The switches 143 and 144 are commonly connected through a wire 146, with the positive line of the electrical circuit to the building. Located adjacent each gate 139 and adapted to be actuated upon the opening of the gate, are circuit interrupting switches 147, upon the up side of the conveyor and switches 148 on the down side of the conveyor. The lower switch 147 is connected on one side with the positive source of current, by a wire 149, while a wire 150 has connection at the other side of the switch and with one side of the upper switch 147. A wire 151 leads from the opposite side of the upper switch 147, to one side of the upper switch 148 and a wire 152 leads from the opposite side of the upper switch 148, to one side of the lower switch 148. From the opposite side of the lower switch 148, the wire 111 leads to the breaker block 108. Wire 115 leads from the block 112 to one side of the motor 97, while a ground wire 153 leads from the opposite side of the motor to the negative line, thus establishing a complete circuit to the driving motor 97, with the several switches 147 and 148 being in series. As before pointed out, the conveyor is interrupted in its rotation for each floor level automatically by the breaker device illustrated in Figure 12. It is also necessary that the motion of the conveyor be prevented during the interval required for the loading or unloading of the vehicles. To provide for this contingency, the switches 147 and 148 have been provided and these switches or any one of them that are opened by the raising of a gate 139, interrupts the flow of current to the motor 97, so long as any gate remains open. It is contemplated that the gates shall be raised through the medium of the motors 140 at such time as the particular floor shall be selected from the dispatch office and that such gates shall move to closed position automatically by gravity when the current is interrupted to the motors 140, thus reestablishing the flow of current to the motor 97 for moving the conveyor to the next floor level. On the several floors, but only on the upside of the conveyor, the motors 140 are connected to the contacts 83 by a wire 154 of the switches 80, while the opposite side of the motors are connected to one side of the connector 92, by a wire 155. The opposite side of the connector is tapped into the ground wire 153, by a wire 156. A positive conductor 157 from the switch 143, leads to the motor 79 and one terminal of the connector 90, by a wire 158. A positive electrical conductor 159 leads from the switch 144 to a conductor 160 that has connection with the motor 79 and one terminal of the connector 90 upon the upper floor level, while the opposite terminals of each connector 90 is connected to the ground wire 153, by wires 161.

Upon the down side of the conveyor, it is contemplated that the several instrumentalities of the device shall be controlled at the will of the floor attendant. The connectors 91 for the bypass control of the carrier motors has one terminal connected to the positive conductor 162 by a wire 163, while its opposite terminal is connected to the negative line 164, by a wire 165. Each motor 140 on the down side is connected to the positive line 162, by a wire 166, while the opposite side of the motors 140 are connected to one terminal of the connectors 93, by a wire 167. The opposite terminal of the connectors 93 are connected to the negative line 164, by a wire 168. A cut-out switch 169 is arranged in the wire 168 for the manual control of the gate motors on the down side. The roller conveyors 74 are operated through the medium of the motors 78 and these motors are manually controlled from a wire 170, leading from the positive line 162, having a switch 171 interposed therein, while a wire 172 leads from the motors 78 to the negative line 164, by a wire having connection in the wire 168.

The several motors of the carrier are simultaneously controlled when the carrier reaches a floor level on the up side, by the connectors 84, having one terminal connected to the post of the switch 69, by a wire 173, while a wire 174 extends from the post to one side of the motors 44. The opposite terminal of the connector 84 is to be connected to a contact 72 by a wire 175, while a wire 176 leads from the contact 72 to the opposite side of the motors 44. From the connectors 85 at the opposite end of the carriers, a wire 177 leads from one terminal of the connectors 85 to one side of the switch 69 upon one side of the carrier, while a wire 178 leads from the opposite terminal of the connector 85 to the contact 72.

In the use of the device, the conveyor 5 is controlled by the dispatch operator by the closing of the switch 145. A vehicle having been shifted to a position for loading upon the conveyor by the roller conveyors of the ground floor 8, the conveyor 5, as it approaches the point where one of its platforms are about to become aligned with the floor, the brakes have been brought into action, imparting a braking action to the motion of conveyor. At the same time, the wheel 104 is rotating to bring a tooth 105 into contacting relation to the bar 106 and, at the moment the platform is properly aligned, the block 108 will have moved to a point whereby the flow of current to the motor 97 is broken and, since the brakes have imparted their maximum braking action at this time, they are simultaneously released and the conveyor is held against further movement or creeping by the worm and worm wheel drive 96 and 95. Since a vehicle is to be loaded, the operator has closed the switch 171 setting in motion the rollers of the loading conveyor, and since the rollers of the platform are now in motion, due to the engagement of the connector 85 with the connector 91, the vehicle will be moved to full engagement upon the platform. Prior to the closing of the switch 171, the switch 169 has been closed and, since the alignment of the platform has also engaged the connectors 87 and 93, the gate will have been shifted to open position through the medium of the motor 140, opening its adjacent switch 148 to interrupt the flow of current to the motor 97, thus preventing further movement of the conveyor until the vehicle has reached a fully loaded position, even though the heater element has released the block 112 to again establish contact with the block 108. At the time the vehicle has reached the limit of its travel to loading position, the front wheels W have contacted the arms 70 of the switch devices 69, interrupting the flow of current to the motors 44. It is contemplated, that the control of the motors 44 on the ground level 8, shall be from the connectors 85, since obviously, the connectors 84 would reestablish the flow of current to the motors 44 when the switches 69 were opened and would continue the movement of the vehicle from the opposite end of the platform. After the vehicle has been fully loaded, the operator opens the gate control switch 169, permitting the gate to close and reestablishing the flow of current to the motor 97, since the adjacent switch 148 will have closed, and since the blocks 108 and 112 have previously made contact, the conveyor will again be set in motion.

Assuming, that the vehicle is to be unloaded on the next higher floor level, the dispatch operator closes the switch 143. As the platform aligns with the selected floor, the connectors 84 and 90 make contact and the connectors 86 and 92 make contact. Current then flows through wire 157 to one terminal of the connector 90 and to the motor 79 of the floor conveyor 75, through the switch 80 to the gate motor 140, elevating the gate 139 and opening the switch 147, through the wire 155 to one terminal of the connector 92 and back to the negative line 153. Thus, the floor conveyor 75 has been set in motion and the gate has been opened. At the same time, current flows through the connector 84, wire 173, switch 69, to the motors 44, from the motors 44, through wire 176, companion switch 69 and wire 175 to the connector 86 and from the opposite terminal of the connector 90, to the negative line 153, setting the platform rollers in motion and shifting the vehicle from the platform to the floor conveyor. The blocks 108 and 112 having again reestablished their contact, the motion of the conveyor 5 is prevented, since the switch 147 is held open by the gate 139. As the vehicle moves along the floor conveyor 75, its front wheels W contact the switch 80, interrupting the flow of current to the motors 79 and 140, stopping the conveyor 75 and permitting the gate 139 to close, thereby closing the switch 147 and reestablishing a flow of current to the motor 97. The conveyor 5 then continues its movement to the next level, where it is again momentarily stopped by the interruptor due to the shifting of the blocks 108 and 112 for the interval necessary for the heater 118 to release the block 112 to reestablish the flow of current to the motor 97. As the bar 106 is released from a tooth 105, the spring 109 shifts the blocks 108 and 112 to the left for resetting the device by again latching the block 112 through the medium of the spring fingers 116 and 117. The operation of the mechanism for the several floor levels on the up side is identical and controllable by the switches 143 and 144, it being understood, that additional switches corresponding to the switches 143 and 144 will be provided for each storage floor level. The vehicles, after being stopped on the unloading floor conveyors 75 are then moved under their own motive power to a particular stall, by a floor attendant. When a vehicle is conveyed to an upper floor for storage, the dispatcher indicates on a suitable record card the particular stall area for the reception of the vehicle and a chart is maintained on all areas that are full or vacant, so that it can be promptly determined the identical location of the vehicle when it is to be removed and conveyed to the ground level. Through the medium of such a chart, the dispatcher can determine at all times where a vacant stall is available and, when the vehicle is loaded, such stall will be indicated on an attached card and the proper floor level selected by the switches 143 and 144.

When a vehicle is to be removed from storage and transported to the ground floor for delivery, the dispatcher communicates the necesary information to the attendant upon the particular floor, advising him of the number and stall of the vehicle from his chart. The floor attendant then drives the vehicle to the point for loading upon the platform and engages it with the floor conveyor 74 on the down side. The attendant then watches through the gate for an empty platform and, upon observing an empty platform coming down, closes the switch 169. The platform upon proper alignment with the floor, engages its connectors 85 and 87 with the connectors 91 and 93. Since the switch 169 is closed, the connector 87 will establish a flow of current to the gate 139, causing it to open and open the switch 148 for rendering the motor 97 inoperative. The operator then closes the switch 171 causes the floor conveyor 74 to operate to move the vehicle to the platform and, since the connectors 85 and 91 have made contact, current will flow to the motors 44 from the wire 163; wire 177, switch 69 to one side of the motors 44 and then from the opposite side of the motors 44 through the wire 176, switch 69, wire 178 and back to the negative wire 164, setting the platform motors in operation. Thus, through the medium of the floor conveyor 74 and the platform rollers 53, the vehicle is shifted to a fully loaded position. When the vehicle has been fully loaded, its front wheels W contact the switch 69 for interrupting the flow of current to the motors 44. The attendant then opens both switches 169 and 170, causing the gate to close and the floor conveyor to stop. Movement of the gate to closed position permits the switch 148 to close and places the motor 97 in circuit, at which time the conveyor 5 starts its travel again for conveying the vehicle to the ground level to be discharged upon any desirable form of floor conveyor.

From the foregoing, it will be observed that a very novel and highly efficient device has been provided to convey motor vehicles from a ground level to elevated levels with a minimum of effort and cost. The structure in itself utilizes a well balanced rotatable conveyor that may be formed of varying sizes for the support of varying numbers of vehicle carriers in a simple and novel manner. The operation of the simplified mechanism for maintaining the several platforms level at all times has been well recognized in other arts and has been applied to this invention as a means relatively cheap for maintaining the fixed position of the several platforms throughout their travel with the conveyor, regardless of the load carried thereby and whether the load shall be balanced or unbalanced. The conveyor and its associated mechanism requires a minimum of space for its housing, thereby utilizing the major storage area of the building. The parts are relatively few and simple, requiring a minimum of attention and, as compared with other elevating devices of prior art patents, can be relatively cheaply manufactured and installed.

Figure 20:
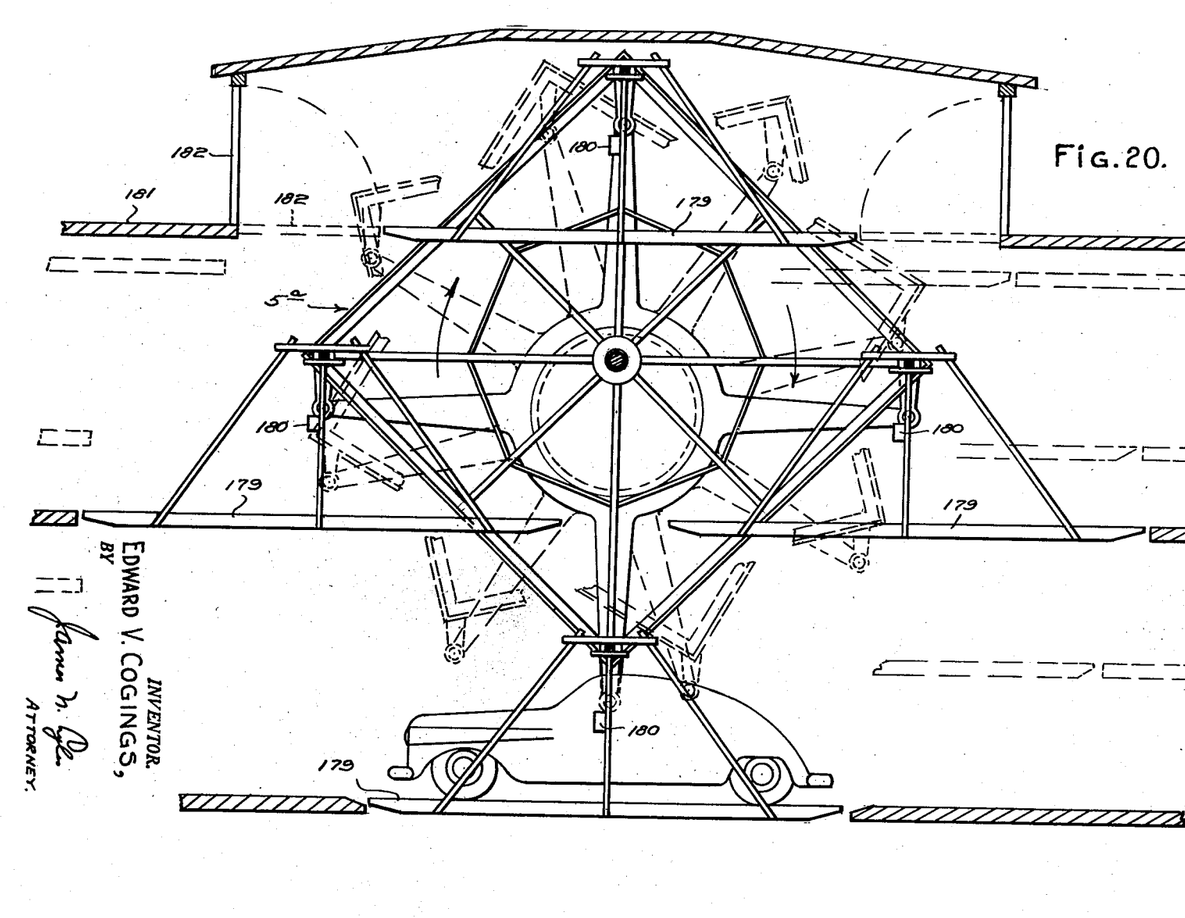

In Figure 20 of the drawings, a modified form of the invention has been illustrated. The structure of the conveyor 5a is substantially identical to that already described and includes the same mechanism for maintaining vehicle platforms 179 level throughout their travel. The conveyor in this form of the invention is shown square, although other shapes could be employed with equal success. The platforms of this form of the invention are plain and contain no loading or unloading rollers. The vehicle is driven by an operator from the ground floor level to a position of loading upon the platform and switch means, generally indicated at 180, supported upon the central support bar of the platform has been conveniently placed within easy reach of the operator for the control of the conveyor drive motor. Various gate devices, not shown may be employed to protect the several floor openings. The storage building will obviously be designed for this particular structure and, as shown by dotted lines in Figure 20, the roof area 181 may be utilized as a storage area by providing means to swing suitably reinforced panels downwardly to alignment with the platforms when in their uppermost position so as to form bridging trackways from the platform to the roof. Various staggered floor levels have been indicated in dotted lines to illustrate the flexibility of this device.

It is to be understood, that the invention is not limited to the precise arrangement shown, but that it includes within its purview, whatever changes fairly come within either the terms or the spirit of the appended claims.

Having described my invention, what I claim as new and desire to secure by Letters Patent is:

1. In a vertically rotatable conveyor for vehicle parking garages having multiple storage floor levels, that comprises a pair of spaced circular frames drivingly supported in concentric position upon a main drive shaft, a drive motor and gearing between the motor and the shaft, brake means engageable with the shaft and intermittently operated to brake and release position by the gearing, equidistantly spaced cross shafts supported around the circumference of the frames and extending between the frames with their opposite ends journalled in the frames, hangers fixed upon the cross shafts rigidly, vehicle supporting platforms carried by the hangers, means operable under the rotative influence of the frames for maintaining the platforms level throughout their travel with the conveyor, trackways extending for the full length of the platforms, a plurality of sets of shifting rollers extending across the trackways and forming the bottom of the trackways, individual electric drive motors for each set of rollers, the conveyor associated with a circuit interruptor means operable by the rotation of conveyor shaft and which causes the conveyor to stop with the several platforms in floor alignment, and release means in the interruptor for again starting the conveyor automatically, the interruptor so timed as to interrupt the motion of the conveyor for each floor level and interruptor switches on each platform operable to stop the platform motors when the vehicle is in fully loaded position.

2. A rotary elevating vehicle conveyor for storage buildings having multiple floor levels, comprising a pair of spaced circular frames concentrically supported upon a drive shaft, bearings for the shaft, a worm wheel for rotating the shaft, a worm engaging the worm wheel, a prime mover for driving the worm, a pair of brake levers supported adjacent the worm wheel for intermittent gripping action upon the drive shaft to interrupt the rotation of the conveyor, means carried by the worm wheel for intermittently shifting the levers to braking position, each conveyor frame provided circumferentially with equidistantly spaced and axially aligned bearings, cross shafts extending between the frames with their opposite ends rotatably supported in the frame bearings, the shafts being formed square intermediate their ends, cross heads rigidly supported on the squared shafts against rotation with respect to the cross shafts, hanger bars carried by the cross heads, vehicle supporting platforms supported by the bars, means associated with the circular frames and having connection with the several cross shafts to maintain the platforms level throughout the rotative movement of the conveyor, trackways formed in the platforms for their full length, a plurality of sets of closely arranged rollers extending across the bottom of the trackways for simultaneous rotation in one direction, independent drive motors for each set of rollers, interrupter switches extending into the trackways and in the path of the front wheels of a vehicle being loaded upon the platform for interrupting the platform motors when a vehicle has been fully loaded, the conveyor adapted for use in connection with electrical means at each floor level to re-establish a flow of current to the platform motors when the vehicle is to be unloaded at a particular floor level.

3. The structure as recited in claim 2, wherein the sets of rollers are journalled in bearings with one roller in each group upon opposite sides of the platform having a drive shaft extended inwardly in axial alignment with each other, bearings for the inner ends of the extended shafts, large bevelled gears fixed upon the terminal ends of the extended shafts and arranged in identical manner, small bevelled gears arranged at a right angle and meshing with the large bevelled gears, large spur gears driven by the bevelled gears, a pinion jointly driving the spur gears, a drive motor for the pinion, each roller at its ends provided with sprocket teeth, a common sprocket chain engaging all of the sprockets at each end of the rollers in each group, said rollers rotating in one direction for shifting the vehicle along the trackways, housing cover plates for the motors, roller bearing and sprocket chains and hinged cover plates for the several operative parts.

4. A vertically rotatable vehicle conveyor for parking garages having multiple floor levels, comprising a pair of identical rigid and spaced octagonal frames, a drive shaft for the concentric support of the frames, bearings for the rotatable support of the shaft, each frame having journal bearings around its periphery at equidistantly spaced points, with the bearings of the two frames being axially aligned, cross shafts having cylindrical ends for support in the several frame bearings, each cylindrical end being grooved for the reception of radial keys carried by the bearings, the cylindrical ends extending outwardly of the frames and provided with vertically arranged crank arms keyed thereon, the several cross shafts intermediate the bearings being formed square, cross heads fixed on the squared shafts adjacent the bearings, hangers fixed to the cross heads, vehicle platforms carried by the hangers, vehicle shifting rollers operatively supported in the platforms, levelling means for maintaining the platforms level throughout the travel of the conveyor, said levelling means comprising a ring having radial arms pivotally connected to each crank, a bearing for the rotatable support of the rings eccentrically mounted from the conveyor shaft bearings, gearing for driving the conveyor shaft, a motor for driving the gearing, a pair of identical brake levers pivotally supported adjacent the gearing with the levers overlapping at their braking portions and adapted to intermittently grip the conveyor shaft, the pivotal points of the levers being eccentric to the gearing, a plurality of pins carried by the gearing and projecting into the path of the outer ends of the levers for swinging the levers in an eccentric circle to braking position, the terminal ends of the levers moving out of the path of the pins at their maximum braking position, springs for moving the levers to release and reset position when disengaged from the pins of the bearing, an interrupter switch for the drive motor and means actuated by the rotation of the conveyor shaft for actuating the interrupter switch at predetermined points during the rotation of the conveyor.

EDWARD V. COGINGS.

References Cited in the file of this patent

UNITED STATES PATENTS

| Number | Name | Date |
|---|---|---|
| 741,964 | Harlan | Oct. 20, 1903 |
| 1,269,825 | Langdon | June 18, 1918 |
| 1,417,224 | Anderson | May 23, 1922 |
| 1,619,966 | Blackham et al. | Mar. 8, 1927 |
| 1,871,372 | James | Aug. 9, 1932 |
| 2,047,347 | Wheelock | July 14, 1936 |
| 2,161,750 | Schonwald | June 6, 1939 |
| 2,446,344 | Smith | Aug. 3, 1948 |

FOREIGN PATENTS

| Number | Country | Date |
|---|---|---|
| 466,079 | Germany | Sept. 28, 1928 |
| 342,416 | Great Britain | Feb. 5, 1931 |